United States Patent [19]

Kirillov et al.

[11] Patent Number: 5,118,200

[45] Date of Patent: Jun. 2, 1992

[54] METHOD AND APPARATUS FOR TEMPERATURE MEASUREMENTS

[75] Inventors: Dimitry M. Kirillov; Ronald A. Powell, both of Redwood City, Calif.

[73] Assignee: Varian Associates, Inc., Palo Alto, Calif.

[21] Appl. No.: 537,400

[22] Filed: Jun. 13, 1990

[51] Int. Cl.$^5$ ............................................. G01K 11/18
[52] U.S. Cl. ...................................... 374/120; 374/161
[58] Field of Search ............... 374/120, 117, 121, 127, 374/124, 130, 131, 139, 141, 142, 159, 161, 162, 137; 356/43, 45; 250/341, 339, 359; 219/121.43; 364/472, 473, 551.01, 557

[56] References Cited

U.S. PATENT DOCUMENTS

| | | | |
|---|---|---|---|
| 3,611,805 | 10/1971 | Hishikari | 374/127 |
| 3,632,212 | 2/1972 | Bernal | 356/45 |
| 3,795,918 | 3/1974 | Sunderland | 374/127 |
| 3,832,558 | 8/1974 | Fern et al. | 250/461 |
| 3,986,775 | 10/1976 | Chang et al. | 356/45 |
| 4,136,566 | 1/1979 | Christensen | 73/356 |
| 4,435,149 | 3/1984 | Astheimer | 250/339 |
| 4,463,260 | 6/1984 | Ikeda | 250/339 |
| 4,594,510 | 6/1986 | Brown et al. | 250/341 |
| 4,669,872 | 6/1987 | Ida | 356/43 |
| 4,730,940 | 3/1988 | Herber et al. | 374/127 |
| 4,790,652 | 12/1988 | Uneus et al. | 356/45 |
| 4,790,669 | 12/1988 | Christensen | 374/131 |
| 4,890,933 | 1/1990 | Amith et al. | 374/121 |
| 4,948,958 | 8/1990 | Sweeney | 374/127 |

FOREIGN PATENT DOCUMENTS

1123357 2/1986 U.S.S.R. .............................. 356/45

OTHER PUBLICATIONS

Hellman, et al., "Infra-Red Transmission Spectroscopy of GaAs During Molecular Beam Epitaxy," *Journal of Crystal Growth*, vol. 81 (1987), pp. 38–42.
SpringThorpe, et al., "In Situ Growth Rate Measurements During Molecular Beam Epitaxy Using an Optical Pyrometer," *Applied Physics Letters*, vol. 55, No. 20 (13 Nov. 1989), pp. 2138–2140.

*Primary Examiner*—Allan N. Shoap
*Assistant Examiner*—W. Morris Worth
*Attorney, Agent, or Firm*—Gerald M. Fisher

[57] ABSTRACT

Remote measurement of temperature of a process chamber provided with a substrate exhibiting a temperature dependent band gap which substrate is illuminated by a source of continuous spectrum light with a spectrum which overlaps the band gap edge of the substrate. The light which exits the substrate is focused by a lens and is picked up by a fiber optic which takes it to a spectrometer where the spectrum is analyzed to ascertain the intensity versus wavelength histogram for exit rays in the wavelength region of the equivalent band gap of the substrate. The wavelength at the point of infection in the region of band gap edge of the substrate in the histogram of the wavelength versus intensity characteristic of exit rays determines the real time substrate temperature from predetermined calibration data which correlates the wavelength at the point of inflection to actual temperature of the substrates.

11 Claims, 6 Drawing Sheets

METHOD AND APPARATUS FOR TEMPERATURE MEASUREMENTS

FIELD OF THE INVENTION

This invention relates to thermometry and to methods and devices for remotely determining the temperature of a substrate with particular application to molecular beam epitaxy (MBE), chemical vapor deposition (CVD), rapid thermal processing (RTP) and etch.

BACKGROUND OF THE INVENTION

Fabrication of semiconductors requires monitoring and controlling temperature during process steps. Sensitivity and accuracy over a wide temperature range (e.g. room temperature to approximately 1000° C.) is important. Speed with which real time corrective response is provided is additionally required. Thermocouples, optical pyrometers and fluorescent techniques are well known and their limitations are well documented. Thermo-couples are inaccurate in non-contact mode particularly in vacuum environment. Pyrometry methods rely on knowledge of surface emissivity which is generally varying during the semiconductor process applications. It may be impossible to use pyrometry at low temperatures when semiconductor substrates are transparent to emission from a heater. Fluorescence is not generally suitable for measurements above 450° C., particularly in those combinations employing combustible binders.

It is also known in contact type measurements to determine temperature using a material which exhibits a light absorption characteristic which is a function of temperature. U.S. Pat. No. 4,669,872 discloses the use of GaAs as a material having an absorption characteristic which is useful in temperature determining applications. That patent discloses an attempt to calculate the wavelength at the GaAs absorption band edge and uses the known correlation between the band edge wavelength to substrate temperature. U.S. Pat. No. 4,790,669 also uses GaAs as a temperature determining element and attempts to determine a reference wavelength value by measuring the wavelengths at ½ peak intensity and using an algorithm to establish the temperature. It is also known in molecular beam epitaxy of layers onto GaAs substrates to use the known band edge absorption characteristic of GaAs in an attempt to determine the temperature of the substrate during the layering process. See Hellman, et al., *Infra-Red Transmission Spectroscopy of GaAs During Molecular Beam Epitaxy*, Journal of Crystal Growth, v. 81 (1987) pp. 38–42. This prior art technique as depicted by the Hellman article is not amenable to commercial application as stated by Hellman because of its slowness, complexity and because its absolute accuracy was quite poor (±10° C.). The Hellman technique is also unfavorable because it would be difficult to apply to doped substrates, requires accurate knowledge of the precise thickness of the substrates and is affected by presence of thin films on the substrate and windows which can interfere and mask the true temperature measurement.

SUMMARY OF THE PRESENT INVENTION

Our invention provides a highly accurate, repeatable, real time substrate temperature measuring apparatus and technique with particular benefits in conjunction with molecular beam epitaxy and other processing techniques which use radiation heating of wafers by providing a means for establishing the wavelength corresponding to the point of inflection in the wavelength vs. transmission intensity histograph.

DETAILED DESCRIPTION OF INVENTION

Molecular beam epitaxy (MBE) has become increasingly important because of its abilities to control the growth of layers at the monolayer level. As these requirements for control intensify, the need to measure and control temperature of a wafer have become more demanding. Although infra-red transmission spectroscopy has been employed in MBE for temperature measurements as described in the Hellman, et al. article referenced above, the technique there described was inaccurate, slow and generally unsuitable for commercial MBE temperature control.

In the earlier Hellman approach and in U.S. Pat. No. 4,669,872, attempts using the band gap characteristic, were made to determine the wavelength at the exact band gap edge by measuring the band gap of the temperature sensitive material at high temperatures and comparing the band gap to that band gap determined at room temperatures. Temperature of the device is then determined by calculation using a published equation or an extrapolation relating band gap to temperature for the particular material. There are many sources of error in determining the band gap edge on a wafer while it is installed in the MBE machine. The black body radiation from the heated wafer will seriously degrade the measurement even if attempts are made to compensate for this interference. Since the wafer temperature is not accurately known, the compensation must necessarily be erroneous. Also, the instability of the heater current, the layer thickness change occurring during temperature measurement, the variations in wafer thicknesses, the collection angle of light, possible window deposition, difference in doping from wafer to wafer, roughness of the surface and reflectivity are each parameters which induce errors in the transmitted intensity measurements upon which the prior art determination depended. U.S. Pat. No. 4,790,669, discloses another method which employs a scheme which employs and relies on the accuracy of intensity measurements to attempt to establish a point in the histogram which can be correlated to temperature. Because of all of the above mentioned factors, process chamber intensity measurements are subject to many effects which induce errors in the measurements.

We have discovered that it was very difficult and unnecessary to determine the wavelength of the absorption edge in the histogram of transmission intensity vs. wavelength. Our invention is based upon our discovery that the wavelength of the point of inflection in the region of the band gap edge in the histogram of intensity of transmitted optical radiation vs. wavelength is accurately correlatable to temperature and is insensitive to the parameters which have degraded prior art approaches. The importance of this discovery is due to the fact that we have also been able to successfully implement a quick and very accurate technique for accurately and repeatably determining the wavelength with precision at the point of inflection in the region of the band gap edge.

This invention is applicable to any material exhibiting an optical band gap which has a width which is temperature dependent. Generally, this includes all materials other than metals and specifically includes semiconductors and insulators. Throughout this application whenever we refer to a "substrate" we mean such a material having a temperature dependent band gap.

For purposes of this discussion, the term "optical radiation" means ultraviolet, or visible, or near-IR radiation on the order of 0.2-10 μm in wavelength.

Figure 5:
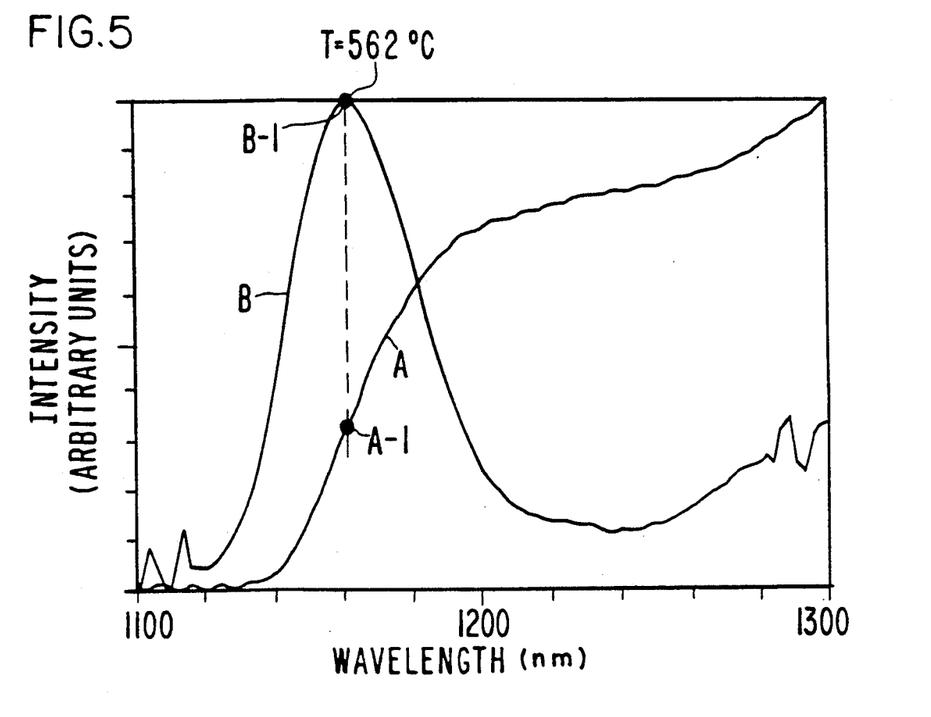
FIG. 5. Histograph (dashed curve) of intensity(I) vs. wavelength ($\lambda$) and an overlaying plot (solid curve) of $dI/d\lambda$ for GaAs substrate installed in MBE machine.

With reference to FIG. 5, trace A is the histogram of intensity (I) vs. wavelength ($\lambda$) from a spectrometer analyzing the near-IR transmitted radiation through a GaAs wafer mounted in an MBE process chamber. The optical radiation source was a heater plate mounted proximate to the wafer such that the radiation passes through the wafer and is received by a remotely located detector. The second curve, trace B, on FIG. 5, represents $dI/d\lambda$ vs. $\lambda$ for the same data represented in line trace A. This second curve is obtained after applying standard data smoothing techniques to the original data using a well known variable point algorithm called the Savitsky-Golay algorithm (Analytical Chemistry, V. 36, p. 1627 (1964)). The maximum in curve B, point B-1, corresponds to the point of inflection, A-1, in curve A.

Figure 3:
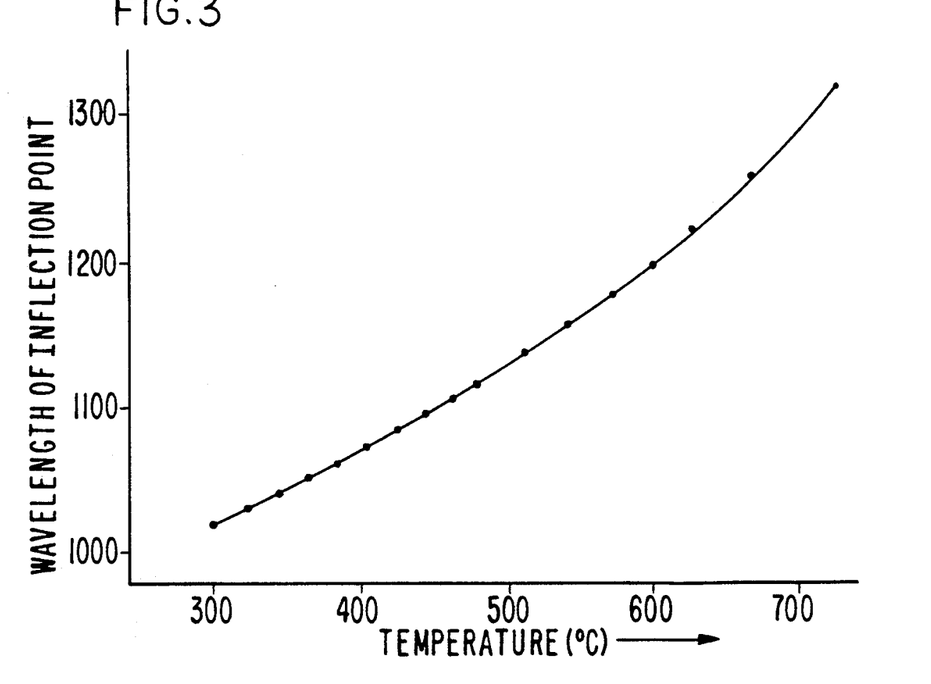
FIG. 3. Graph showing experimentally measured wavelength of inflection point as a function of GaAs temperature.
Figure 4:
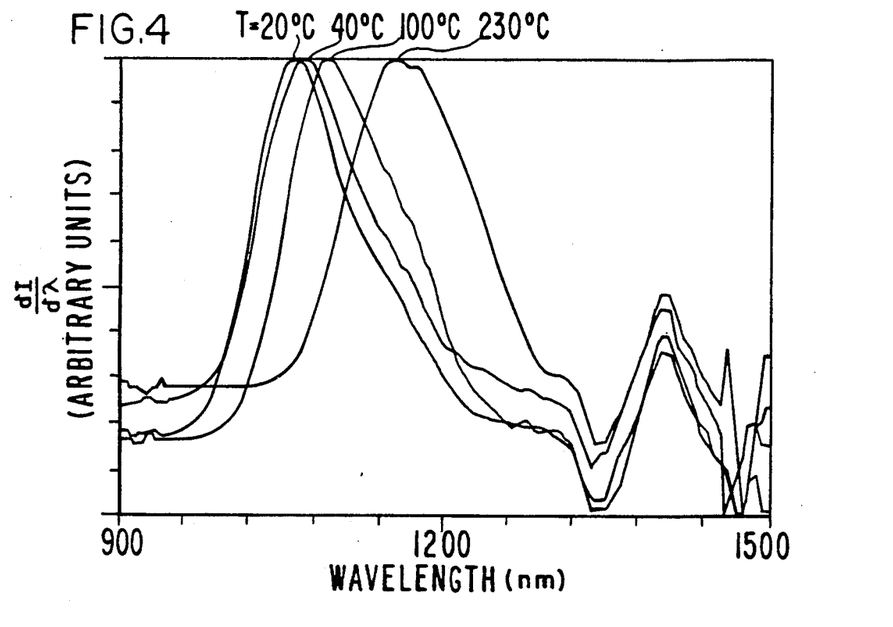
FIG. 4. Graph showing $dI/d\lambda$ vs. $\lambda$ for various temperatures for silicon.

With reference to FIG. 3, we show empirical data which we have determined for GaAs which relates the wavelength of the point of inflection from the histograph of intensity of transmitted radiation to temperature from 300° C. to over 700° C. We have determined that we can accurately and rapidly make temperature determinations of wafers in an MBE machine using our invention to a precision of ±1° C. across this entire temperature range. Because of the fact that our scheme depends on the wavelength at the peak in the $dI/d\lambda$ curve, our technique is not dependent on absolute intensity or upon any slow time dependent changes in intensity. Accordingly, the apparatus and method of our invention avoids the errors brought about by all of those factors which impact intensity mentioned above and which result in the inaccuracy in all of the prior art techniques. FIG. 4 is also a plot of empirical data but FIG. 4 shows for different values of temperature, the curves of the derivation of intensity as a function of wavelength ($dI/d\lambda$) for silicon. This plot shows that our invention is also applicable to indirect band gap materials such as silicon, as well as to direct band gap materials, such as GaAs.

Figure 1:
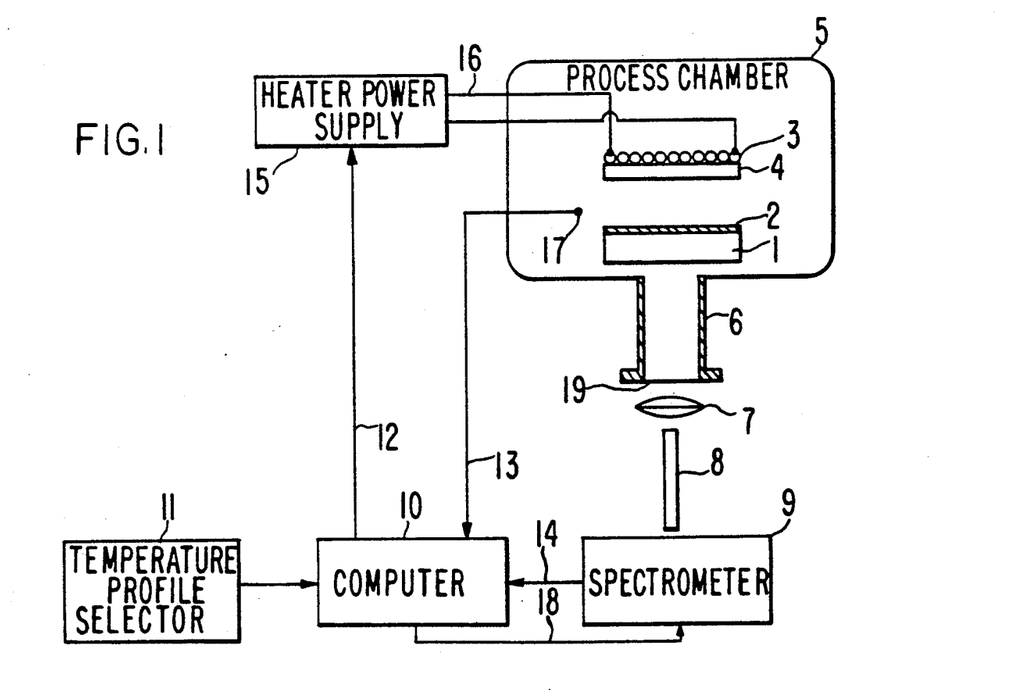
FIG. 1. Block diagram of the preferred embodiment of the invention.

The preferred embodiment of our invention is described in conjunction with FIG. 1. The process chamber 5 is shown containing a heater coil 3 for heating a radiator plate 4, which plate uniformly heats the wafer, substrate 1, upon which a layer 2 is being grown. The spectrum of the radiator overlaps the band gap edge of the substrate 1 and may also overlay the band gap of layer 2 such that the transmitted light beam enters into the wafer 1, passes through layer 2 and wafer 1 and exits through the port 6 and window 19 where it is picked up by a fiber optic after passing through and focused by lens 7 and is taken to spectrometer 9 where the spectrum is analyzed under the control of computer 10. The spectrometer may comprise a motor-driven, traditional diffraction grating and a detector made from an appropriate material. In some cases, to improve signal-to-noise, it may be desireable to add a mechanical light chopper, (e.g. 100-300 Hz) in the spectrometer and use lock-in amplification of the photodetector signal. The spectrometer alternatively could comprise a diffraction member such as a prism or diffraction grating in conjunction with a germanium or indium gallium arsenide photodiode array detector.

Figure 8:
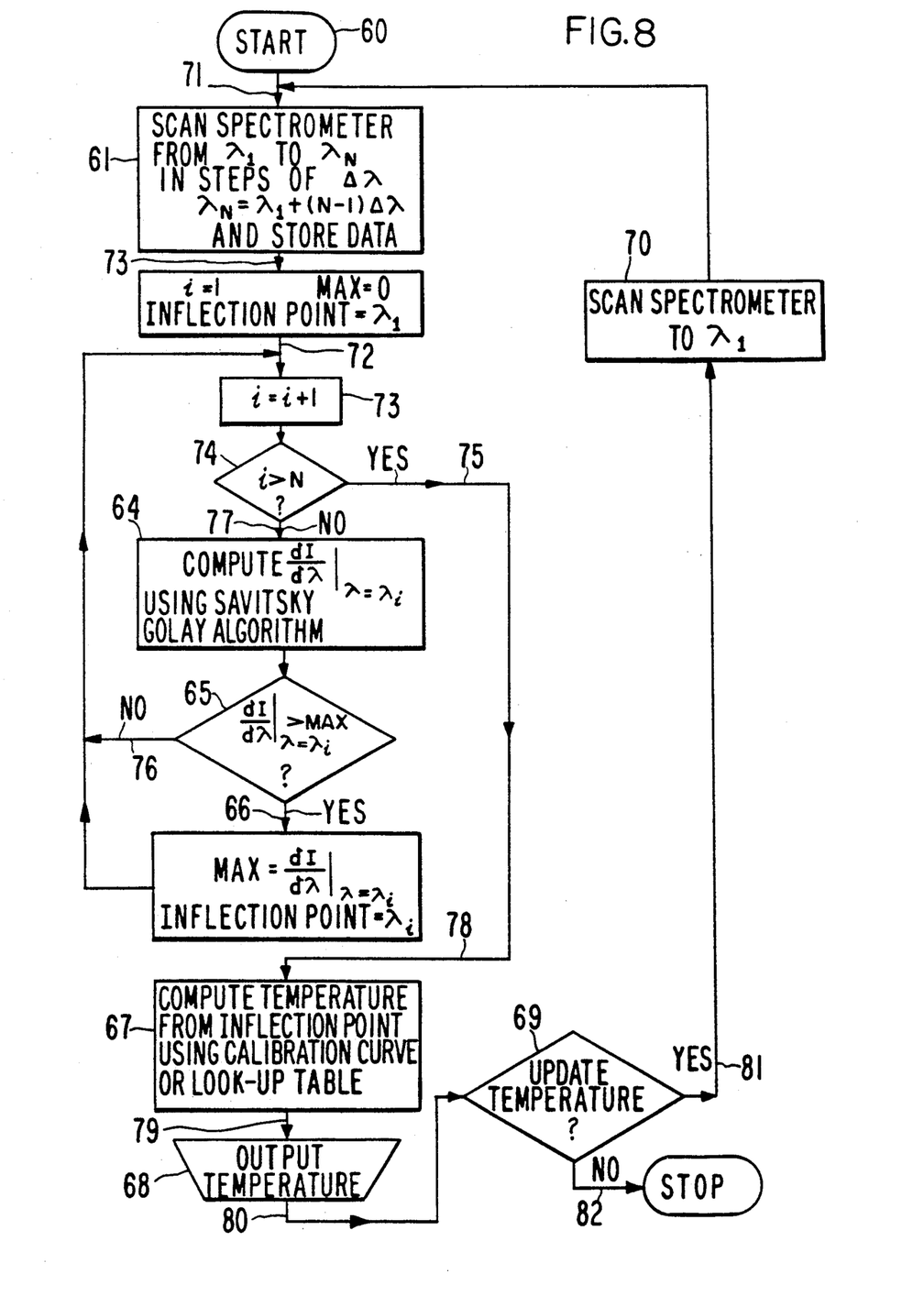
FIG. 8. Flow diagram for point of inflection determination.

In the preferred embodiment of FIG. 1, the spectrometer supplies the output spectrum histogram on line 14 to the computer where the point of inflection in the region of the band gap edge is ascertained along with the corresponding substrate temperature by comparison to a computer look-up table. The flow diagram for the algorithm to determine the point of inflection is shown in FIG. 8. This determined temperature is compared to the selected temperature profile 11 (e.g. a constant temperature or a time dependant temperature) which has been input by the user to the computer. The computer is capable of comparing desired temperature profile to the measured temperature profile and issues commands on line 12 to the heater power supply controller 15 to control heater coil current in wires 16. A thermocouple 17 is also provided which is wired via lead 13 to the computer 10 to serve as a back-up temperature monitor in the event of malfunction.

Our test data shows that our inventive method and physical equipment is insensitive to wafer changes such as different wafer thickness (such as fluctuations between standard wafers from different sources), doping levels, patterns on the wafer, dielectric cap layers, or implantation layers.

There is no theoretical reason why our invention would not be useful up to the melting point of the material being examined. Although use of a pyrometric heater as a source of radiation below approximately 300° C. may be difficult to use in our method because of the low intensity of its near-IR emission, the technique can be employed at lower temperatures by providing a beam from an independent light source such as broad band tungsten filament lamp source. This in fact was how the data in FIG. 6 was obtained.

Figure 2:
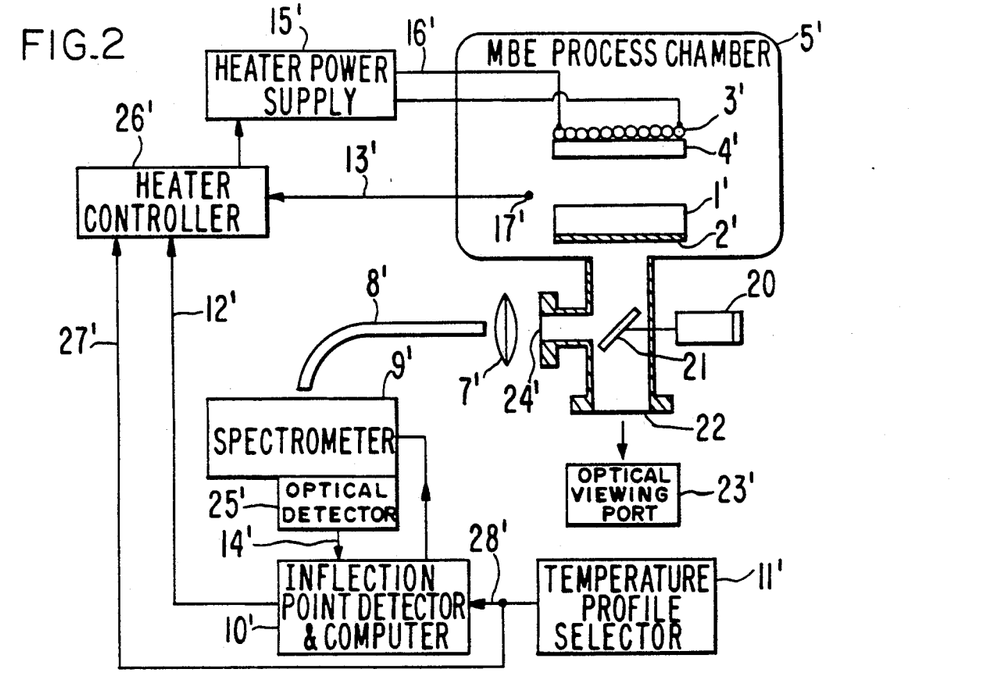
FIG. 2. Block diagram of a further embodiment of the invention.

In reference to FIG. 2, another temperature control embodiment is shown in use in an MBE process chamber. In this embodiment optical radiation passes through the wafer 1' and layer 2' and is deflected by a rotatable mirror 21' to a side port 24' through an optical lens 7' into a optical fiber 8' and is then introduced into the spectrometer 9'. In this embodiment the spectrometer contains a scanning diffraction grating and germanium IR detector 25' which outputs its signal to the inflection point detector 10' which determines the inflection point near the band edge and compares the indicated temperature to the operator's selected temperature profile input 28'. In this embodiment, the thermocouple 17' is connected to heater controller 26'. Heater controller 26' is responsive to both the thermocouple 17' for very high speed temperature corrections and to slower calibration inputs on line 12' from the inflection point detector 10'. This FIG. 2 embodiment enables the heater controller 26' to be responsive to the thermocouple 17' on a very short time constant basis, as like 5 milliseconds. However, the inflection point detector and computer 10' can provide comparison between the transmitted near-IR and the temperature selector profile approximately every 20 seconds. This permits use of the near-IR transmission technique to recalibrate the heater controller every 20 seconds or so and during the remaining time for the controller to be quickly responsive to thermocouple 17'. This technique also permits the use of the lower cost scanned monochrometer, even though its inherent delay might otherwise be unsatisfactory for highly demanding semiconductor processing applications. We have also demonstrated the use of a self scanned 128 element germanium diode array which quickly completes the spectrum accumulation and analysis, i.e. on the order of 100 milliseconds, and may permit the elimination of the thermocouple control circuit and the motor driven diffraction grating in certain applications.

Figure 6:
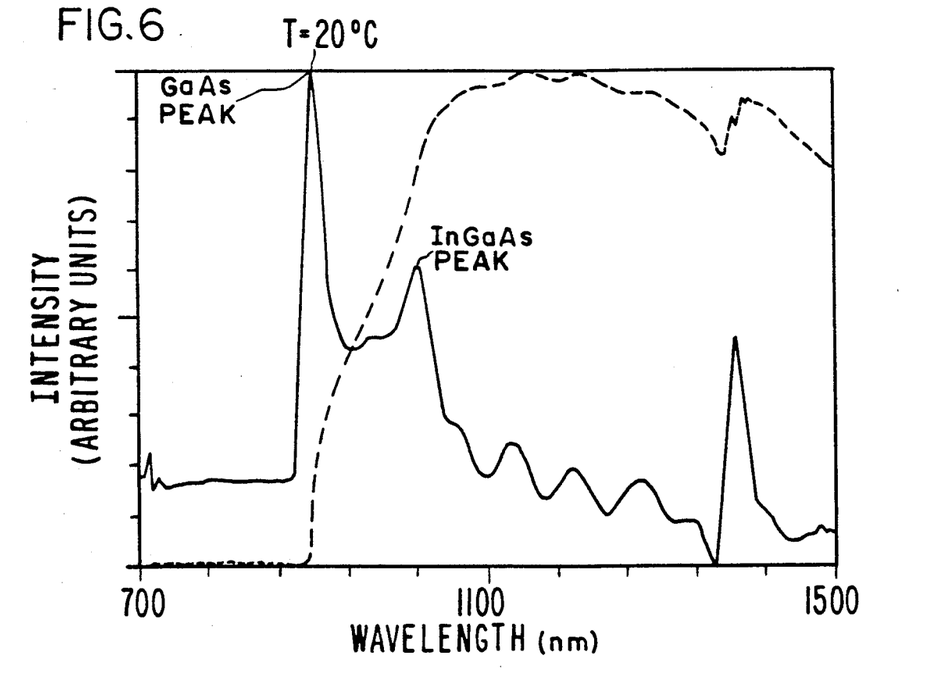
FIG. 6. Histograph (dashed curve) of I vs. $\lambda$ and overlay (solid curve) of $dI/d\lambda$ vs. $\lambda$ for layer of $In_{0.2}Ga_{0.8}As/GaAs$.
Figure 7:
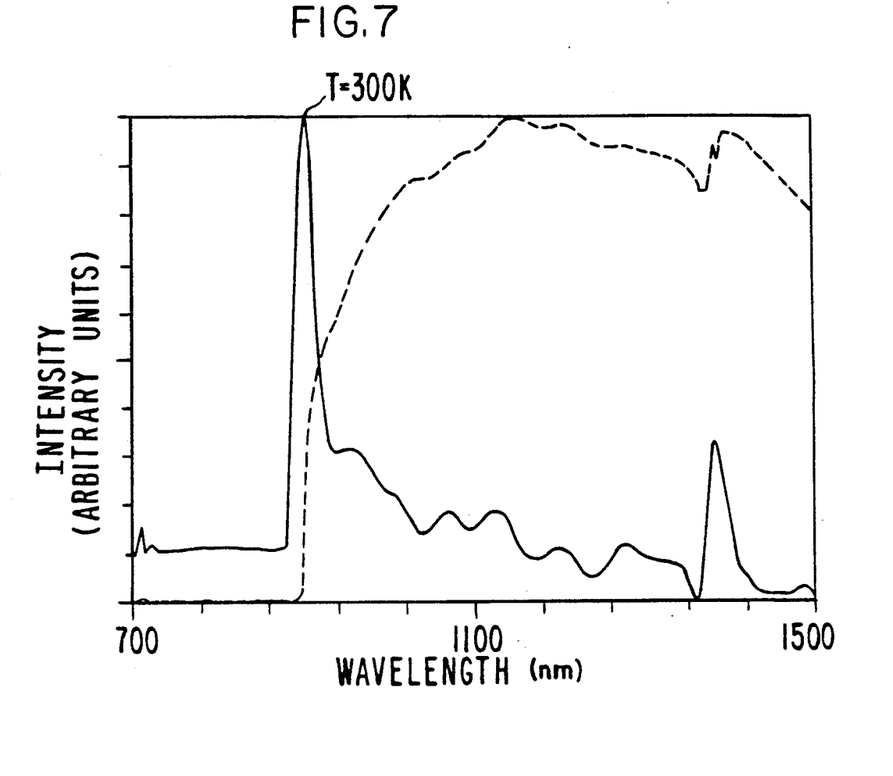
FIG. 7. Histograph (dashed curve) of I vs. $\lambda$ and overlay (solid curve) of $dI/d\lambda$ vs. $\lambda$ for a layer of $Al_{0.35}Ga_{0.65}As/GaAs$.

With attention to FIGS. 6 and 7, we have plotted data demonstrating the utility of our invention on a 500μ thick GaAs wafers upon which a 1μ overlayer of $In_{0.2}Ga_{0.8}As$ and $Al_{0.35}Ga_{0.65}As$, respectively was grown in an MBE machine. A key benefit of our invention is the ability to accurately measure substrate temperature during growth of a thin film irrespective of whether the films absorb near-IR radiation. Deposition of GaAs or As film on windows also does not prevent us from carrying out our method. The attenuation of such films and/or optical interference effects to which they give rise alters the transmitted radiation intensity so that one would not know with the prior art methods whether the wafer had changed temperature or whether the overlaying material had changed thickness. When our inflection point approach is employed, the temperature is determined without interference from intensity varying parameters. Our apparatus will work adequately if the system is simply supplied with sufficient transmitted energy to be able to determine wavelength at the inflection point.

Figure 10:
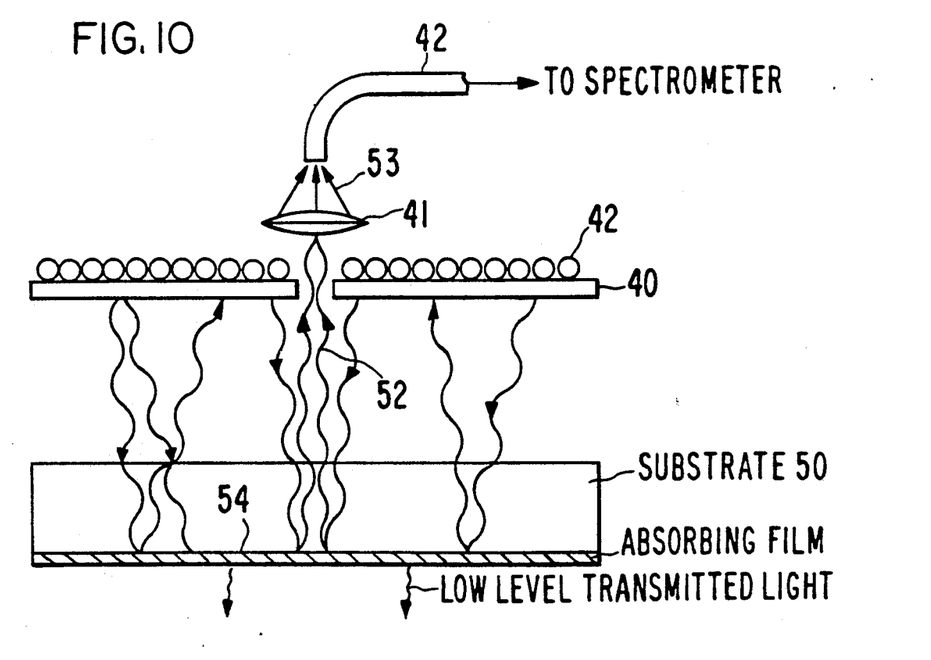
FIG. 10. Functional diagram of reflection embodiment of a portion of the invention.

In cases where the film on the surface of the substrate is so highly absorbing that little or no light is transmitted, an alternate approach can be used in which one detects the light reflected back from the film/substrate interface as depicted in FIG. 10. In effect, heating coil 42 and radiator 40 produces the light rays 52' which are reflected from interface 54 after the rays have transmitted through a path of twice the thickness of substrate 5. The reflected radiation from this film/substrate interface can be directed to a collecting lens 41 for focusing rays 53 on the fiber optic 42 for transmitting to the spectrometer. The reflected rays in this instance will also have a histogram which exhibits the band gap absorption wavelength function characteristic of the substrate material.

Other techniques can be used to determined the inflection point, such as the zero crossing point of the second derivative, $d^2I/d\lambda^2$. Some advantages can be obtained in using the second derivative if the spectrum of the original data has a low noise content. In such cases, the control loop of the temperature controller might be simplified by seeking a minimum.

With reference to FIG. 8, the flow diagram for the determination of the point of inflection is depicted. The intensity data is collected as depicted in block 61 by causing the spectrometer to collect transmission intensity ($T_i$) vs. wavelength ($\lambda$) histogram in small steps, $\Delta\lambda$, then the data file is stored. Next, solve for the inflection point wavelength $\lambda$, using the Savitsky-Golay algorithm and testing for maximum of $dI/d\lambda$ as depicted in decision point 65.

This computation is started in the inner loop at 72 after initializing MAX=$\phi$ and inflection point=$\lambda_1$. Each value of $dI/d\lambda$ is calculated in box 64 for each value of N and compared to MAX as shown or decision point 65. If $dI/d\lambda$ is greater than MAX, the command at 66 causes a new value of MAX to be set up equal to $dI/d\lambda_{/\lambda=\lambda i}$ and the inflection point is set equal to $\lambda_i$. When all data has been examined, the decision block 74 will indicate i>N and the loop will output a command, 78 to block 67 to compute temperature from the inflection point $\lambda_i$ from look up tables or calibration curves.

If $dI/d\lambda_i$ is not maximum, send control 76 to restart the loop at 72.

The result of box 67 is output as the substrate temperature indicator and if the system is still on, the decision point 69 sends the command to scan the spectrometer back to the beginning (or reverse scan) as depicted in block 70, and then restarts the program with the command 83 to restart.

Figure 9:
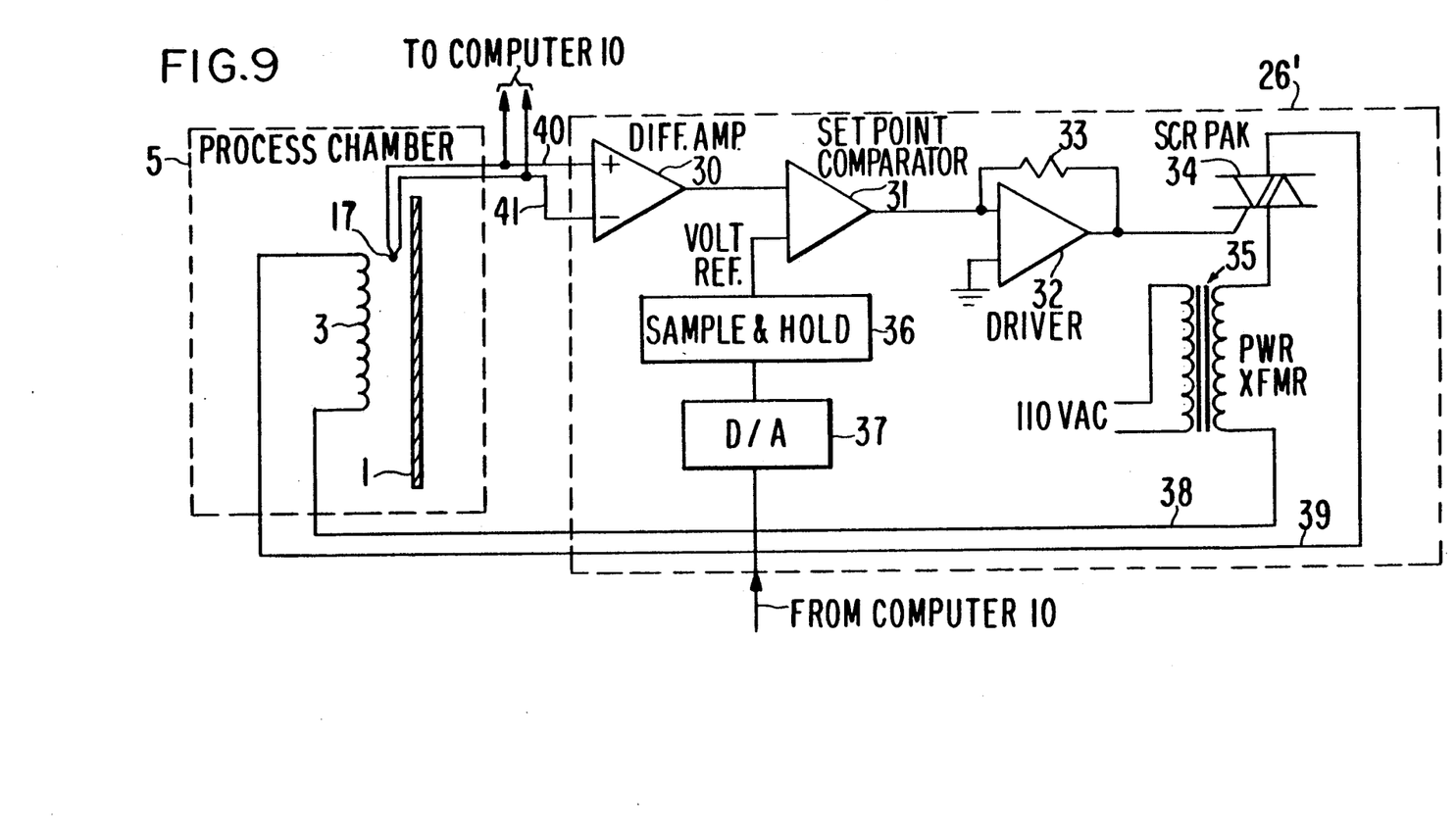
FIG. 9. Schematic of thermocouple recalibration circuit.

With reference to FIG. 9, the circuit for controlling the processing chamber temperature is disclosed. The signal from the thermocouple 17 is fed to both the computer 10 and to a differential amplifier 30 having appropriate impedance so as not to load the thermocouple. The output of the differential amplifier 30 is sent to a set point comparator 31 where it is compared to a reference voltage. In this instance, the reference voltage is provided from a sample and hold circuit 36 which is periodically updated from computer 10 via a digital to analog converter 37. Whenever the computer senses that the selected temperature profile differs from the actual measured temperature profile based on the inflection point determined temperature, a voltage difference appears at the input to comparator 31 which comparator generates an output signal of the amplitude and sense to cause the driver 32 to control the silicon controlled rectifier pack 31 and vary the ac power from the transformer 35 to the excitation heater coils 3 in the process chamber 5.

Having thus set forth and disclosed the nature of our invention, what we claim is as follows.

We claim:

1. Method for remote determinations of temperature of a substrate in a process chamber comprising;

causing light rays to impinge upon the surface of said substrate, the temperature of which substrate is desired;

receiving said light rays after said light rays have impinged upon and exited, as exit rays, from said substrate;

analyzing said exit rays to obtain a histogram of intensity versus wavelength, said histogram having a point of inflection;

ascertaining the wavelength of said point of inflection in the histogram of intensity versus wavelength for said exit rays in the region of the band gap edge of the said substrate; and determining the temperature of said substrate by extracting said temperature from an experimentally determined relationship between the wavelength of point of inflection for said substrate material and temperature of said substrate material.

2. The method of claim 1 including the further steps of: comparing said determined temperature to a selected temperature profile; and controlling a heater to adjust said determined temperature to said selected temperature.

3. Apparatus for remotely determining the temperature of a substrate in a process chamber comprising:

a substrate, said substrate being supported in a process chamber, said substrate being comprised of a material exhibiting a band gap energy characteristic which is a function of temperature;

a source of heat and a source of continuous spectrum light, said spectrum of said light source overlapping the wavelengths corresponding to band gap energy of said substrate;

means to cause light rays emanating from said light source to impinge upon a surface of said substrate;

means to detect rays from said light source after said light source rays have impinged upon and exited as exit rays from said substrate;

means to analyze said exit rays which have exited from said substrate to ascertain the intensity versus wavelength histograph for said exit rays in the wavelength region of the equivalent band gap energy of said substrate;

means to detect the wavelength at the point of inflection in the region of said band gap energy of said substrate in said histograph of the wavelength versus intensity characteristic of said exit rays including means to determine the wavelength at the point that the rate of change of said intensity as a function of said wavelength is a maximum;

means to determine the temperature of said substrate from predetermined calibration data which correlates the wavelength at said point of inflection to actual temperature of said substrate.

4. The apparatus of claim 3 further including:

means to control the temperature of said substrate to a desired temperature, said means including means for comparing the actual temperature ascertained from said determination of the temperature using said predetermined calibration data to a selected desired temperature and including feed-back means to control the source of heat to minimize the result of said comparison.

5. The apparatus of claim 4 wherein said source of heat and said source of continuous spectrum light comprises an electrically excited heater.

6. The apparatus of claim 4 wherein said process chamber is an molecular beam epitaxy machine.

7. Molecular beam epitaxy apparatus comprising:
(a) an electrically controllable heater for radiatively controlling the temperature of a wafer substrate being processed in said apparatus;
(b) a thermocouple and a heater controller, said thermocouple being connected to said heater controller for controlling said electrically controllable heater responsive to a preselected temperature;
(c) a spectrometer having a detector;
(d) means for causing, in operation, light rays exiting from a wafer substrate to be directed into said spectrometer;
(e) means for obtaining a histograph of the intensity of the said light rays as a function of wavelength, said histograph exhibiting a point of inflection in the wavelength region of the band gap of said substrate;
(f) means for determining the wavelength at said point of inflection in the said histograph including means to determine the rate of change of said intensity as a function of said wavelength;
(g) means to determine the temperature of said wafer from said wavelength of said point of inflection; and
(h) means to provide said determined temperature to said heater controller.

8. The molecular beam epitaxy apparatus of claim 7 wherein, said heater controller includes means to periodically recalibrate said thermocouple temperature determinations.

9. In a temperature measurement system including a broad band light source, a substrate having a temperature dependent bandgap coefficient, a spectrum analyzers for providing a histograph of intensity for a selected range of wavelengths of light from said light source which light has impinged upon and interacted with said sensor, a band gap edge wavelength identifier means including means to select the wavelength of a point in said histogram which point is an indicator of the band gap edge of said sensor, THE IMPROVEMENT COMPRISING said means to select the wavelength of a point in said histogram includes means to determine the point of inflection in the said histogram near said band gap edge.

10. The system of claim 9 wherein the means to determine the said point of inflection includes a means to determine the wavelength at the point in said histogram where the rate of change of intensity as a function of change in wavelength ($\Delta I/\Delta \lambda$) is maximum.

11. The system of claim 10 wherein said means to determine the wavelength where $\Delta I/\Delta \lambda$ is maximum is a computer executing a program using the Savitsky Golay algorithm on said histogram.

* * * * *